United States Patent Office 3,397,061
Patented Aug. 13, 1968

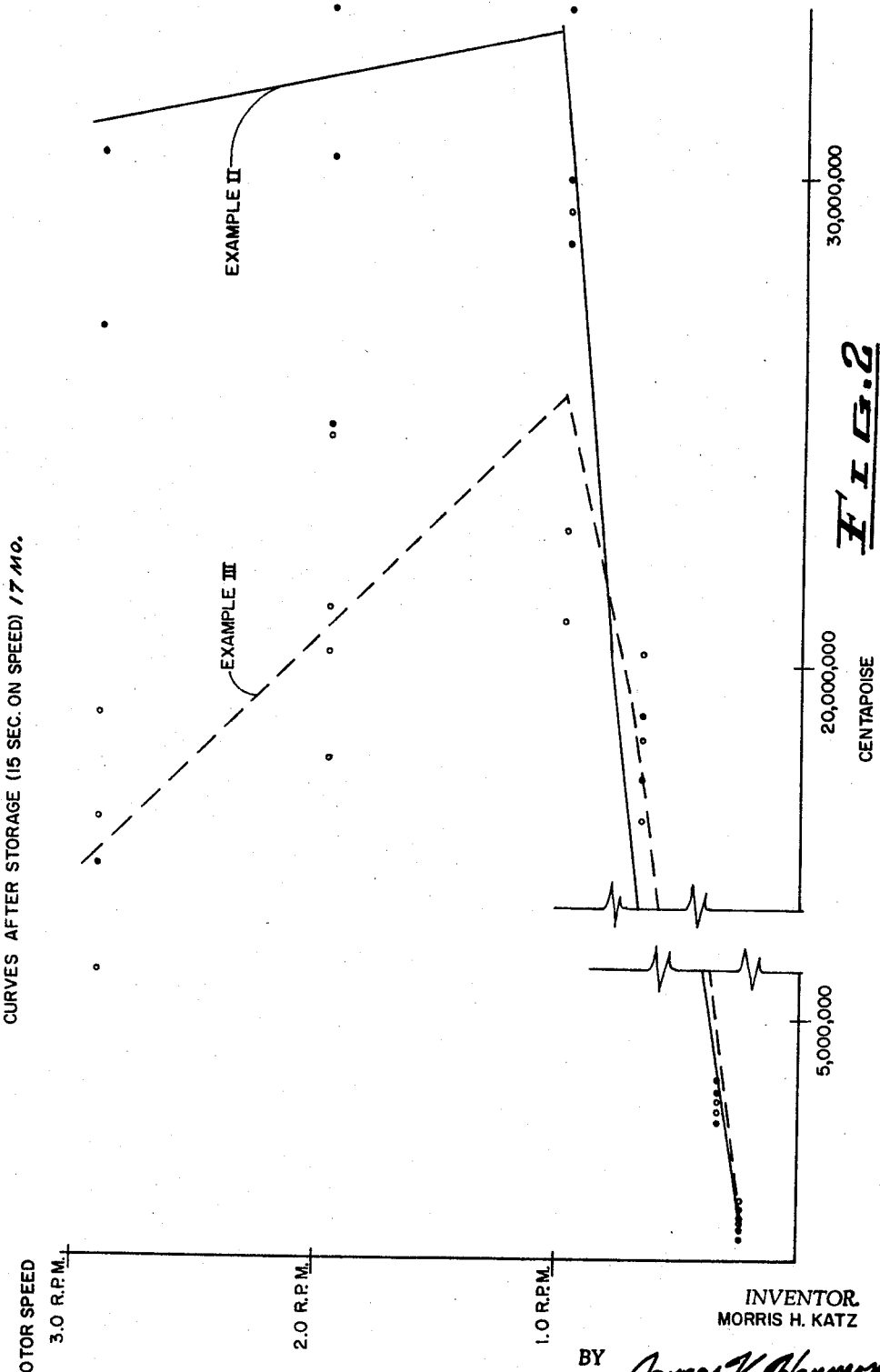

3,397,061
DEPECTINIZED COCOA AND FROSTING COMPOSITIONS CONTAINING THE SAME
Morris H. Katz, St. Louis Park, Minn., assignor to The Pillsbury Company, Minneapolis, Minn., a corporation of Delaware
Filed Feb. 12, 1965, Ser. No. 432,100.
17 Claims. (Cl. 99—26)

ABSTRACT OF THE DISCLOSURE

Prevention of an increase in viscosity upon storage of cocoa food compositions such as cocoa containing frostings is effectively inhibited via the employment of a depectinized cocoa. The depectinized cocoa is suitably provided by enzymatically treating an aqueous cocoa slurry with a pectinase. Additional enzymatic treatment of the depectinized aqueous cocoa slurry with hemi-cellulase and amylase and subsequent incorporation of the resultant enzymatically treated cocoa into frosting prepared therefrom imparts a synergistic resistance to a viscosity increase during storage for the resultant cocoa frosting composition.

---

Figure 1:
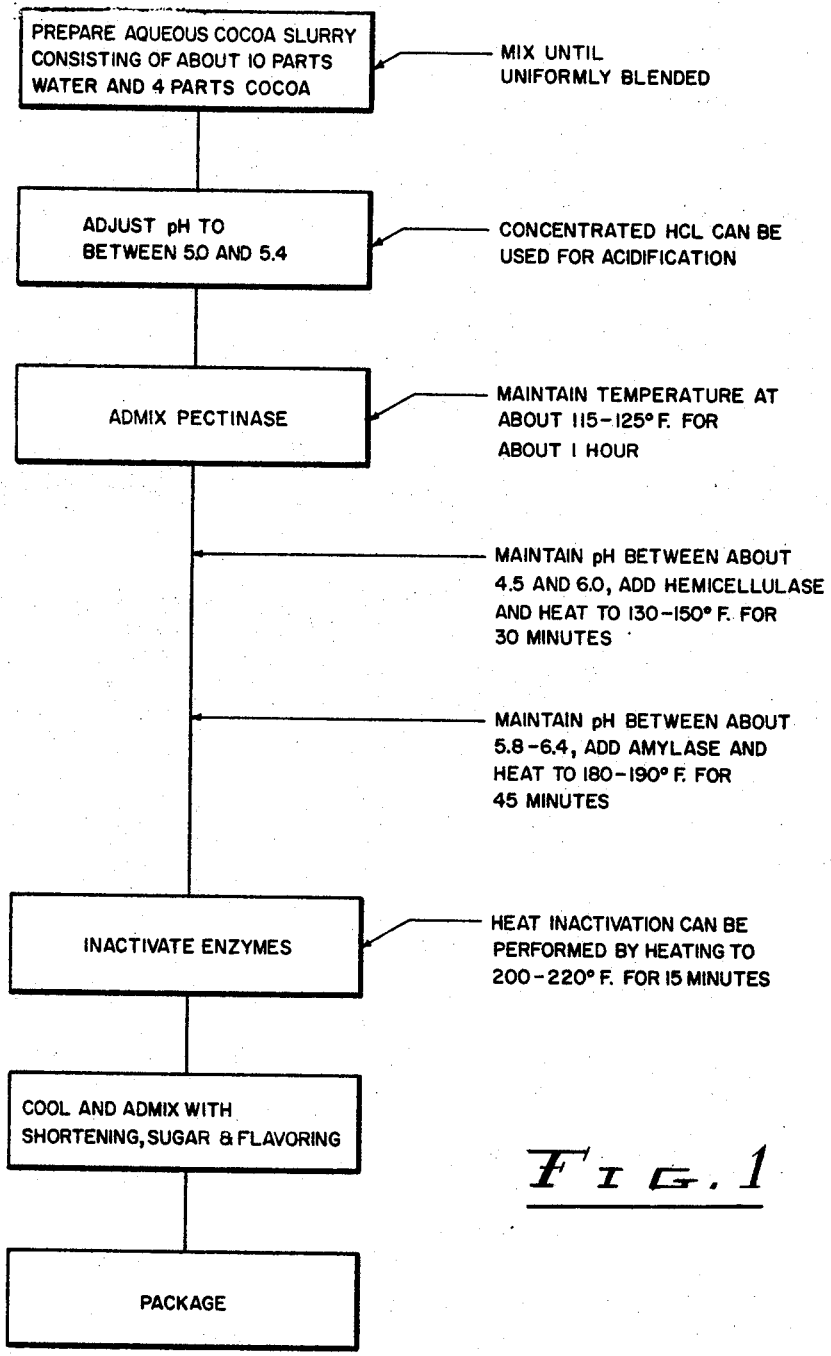

The present invention relates to cocoa compositions, ready-to-spread frosting prepared from said compositions to a process for reducing the tendency of ready-to-spread frosting containing cocoa to thicken during storage.

A number of ready-to-spread frosting compositions containing cocoa or chocolate have been previously proposed. These prior compositions have not been entirely satisfactory, particularly with regard to the ease with which they can be spread over a cake. To be acceptable, the frosting composition must have a sufficiently high initial viscosity to prevent it from running after it has been applied to the cake. On the other hand, the frosting must not be so viscous that an uneven surface effect is produced when an attempt is made to coat the cake.

Moreover, the frosting should not be so stiff and resistant to spreading that the cake is mutilated and torn by the pressures required to spread the frosting. The ready-to-spread cocoa-containing frostings that have been previously available have however exhibited an undesirable tendency to thicken between the time it is packed and the time it is used by the consumer. This thickening phenomenon is not completely understood and as far as I am aware there has been no satisfactory solution to the problem prior to the present invention.

In an attempt to solve this problem, it has been the practice of the assignee of the present application to incorporate into the ready-to-spread chocolate frosting compositions with which the invention is concerned about .2 percent by weight of hemi-cellulase for each 100 parts by weight of the cocoa in the frosting composition and to maintain the cocoa, water and enzyme composition at about 140 ±5° F. for a period of about 30 minutes, next admix about 2.0 parts of amylase for each 100 parts by weight of cocoa and maintain the composition at about 185° F. for a period of 45 minutes in accordance with U.S. Patent No. 1,854,354. It was found however that even after this treatment, an undesirable degree of thickening takes place between the time the frosting is packaged and the time it is used. The possible cause for the viscosity increase was speculated upon but no solution was apparent since the most reliable analysis of cocoa available does not indicate the presence of components known to cause a viscosity increase during storage in an aqueous solution or suspension with the exception of those materials acted upon by hemi-cellulase and amylase. Weigmann gives the following composition given for cocoa nibs in the well-known work, Food Inspection and Analysis by A. E. Leach, published by John Wiley and Sons.

COMPOSITION OF COCOA NIBS

| Commercial Varieties | Moisture | Nitrogenous Substances, including Theobromine | Theobromine | Fat | Starch | Other Carbohydrates | Cellulose | Ash | Sand |
|---|---|---|---|---|---|---|---|---|---|
| Carcas | 7.77 | 14.13 | 1.48 | 45.54 | 19.40 | | 6.19 | 4.91 | 2.06 |
| Trinidad | 7.87 | 14.06 | 1.31 | 44.62 | 25.30 | | 4.55 | 3.48 | 0.10 |
| Surinam | 7.53 | 13.69 | 1.66 | 44.74 | 26.45 | | 4.30 | 3.16 | 0.13 |
| Port au Prince | 7.77 | 14.56 | | 46.35 | 5.97 | 15.53 | 5.19 | 4.15 | 1.48 |
| Machata | 8.17 | 14.06 | | 45.93 | 5.69 | 17.50 | 4.36 | 4.09 | 0.22 |
| Puerto Cabello | 8.08 | 13.50 | 1.51 | 46.61 | 22.9 | | 4.43 | 4.28 | 0.18 |
| Ariba | 8.27 | 15.37 | | 45.15 | 5.83 | 16.96 | 4.48 | 3.88 | 0.14 |

The following are the summarized results of the analyses of seventeen varieties of cocoa seeds made by Winton, Silverman, and Bailey.*

*An. Rep. Conn. Agric. Exp. Sta., 1902, p. 270.

| | Roasted Cocoa Nibs | | | | | |
|---|---|---|---|---|---|---|
| | Air dry Material | | | Water- and Fat-Free Material | | |
| | Maximum | Minimum | Mean | Maximum | Minimum | Mean |
| Water | 3.18 | 2.29 | 2.72 | | | |
| Total ash | 4.15 | 2.61 | 3.23 | 8.81 | 5.76 | 7.04 |
| Water-soluble ash | 1.86 | 0.73 | 1.16 | 3.96 | 1.60 | 2.46 |
| Ash insoluble in acid | 0.07 | 0.00 | 0.02 | 0.14 | 0.00 | 0.05 |
| Alkalinity of ash | 3.35 | 1.50 | 2.51 | 7.12 | 3.29 | 5.32 |
| Theobromine | 1.32 | 0.82 | 1.04 | 2.92 | 1.66 | 2.21 |
| Caffeine | 0.73 | 0.14 | 0.40 | 1.55 | 0.31 | 0.86 |
| Other nitrogenous substances | 13.06 | 11.00 | 12.12 | 28.05 | 23.37 | 25.69 |
| Crude fiber | 3.20 | 2.21 | 2.64 | 6.56 | 4.70 | 5.61 |
| Crude starch (acid conversion) | 12.37 | 9.30 | 11.16 | 25.68 | 19.80 | 23.66 |
| Pure starch (diastase conversion) | 8.99 | 6.49 | 8.07 | 18.61 | 13.82 | 17.10 |
| Other nitrogen-free substances | 21.07 | 17.69 | 19.57 | 44.08 | 38.78 | 41.49 |
| Fat | 52.25 | 48.11 | 50.12 | | | |
| Total nitrogen | 2.54 | 2.20 | 2.38 | 5.41 | 4.74 | 5.05 |
| Constants of fat (ether extract): | | | | | | |
| Melting-point, degrees C | 35.0 | 32.3 | 33.3 | | | |
| Zeiss refractometer reading at 40° C | 48.00 | 46.00 | 47.23 | | | |
| Refractive index at 40° C | 1.4579 | 1.4565 | 1.4573 | | | |
| Iodine number | 37.89 | 33.74 | 34.97 | | | |
| Percent of nibs in whole bean | 92.90 | 86.12 | 88.46 | | | |
| Percent of shells in whole bean | 13.88 | 8.83 | 11.54 | | | |

In an attempt to correct this problem, a variety of materials were tried without success. In the course of this work, I discovered that certain enzymes particularly when combined with the two enzymes previously mentioned were surprisingly effective. The most effective of these enzymes are commercial pectinase preparations. In accordance with the preferred form of the invention, the cocoa and water components of the frosting composition are maintained at a predetermined temperature following the addition of pectinase for a period of time during which time the pectinase presumably acts upon and destroys the pectin, the presence of which is previously unknown in cocoa. While at least one prior patent, No. 2,689,181, suggests the treatment of cocoa beans with an enzyme containing pectinase to help remove cocoa shell pulp from the bean, as far as I am aware, there is nothing in the art which indicates that pectin is a component of the cocoa once the pulp is removed from the outer surface of the beans.

In view of the deficiencies of the prior art, it is thus one object of the present invention to provide an improved prepared ready-to-spread frosting containing cocoa or chocolate exhibiting a reduced tendency to thicken after being packaged.

Another object of the invention is the preparation of an improved prepared ready-to-spread cocoa or chocolate flavored frosting composition wherein minor amounts of a pectinase enzyme are employed at relatively little additional cost for reducing viscosity increases without affecting either the desirable taste or texture of the finished product.

It is another object of the invention to provide an improved process for preparing chocolate frosting wherein a plurality of enzymes are used in succession to produce greater viscosity control than can be achieved when each enzyme acts alone.

Yet another objective of the present invention is the provision of an improved process for the treatment of prepared ready-to-spread chocolate or cocoa frosting compositions adapted to make the most effective use of the plurality of enzymes thereby minimizing the amount of enzyme required to produce the desired results.

These and other more detailed and specific objects will be apparent in the following specification which sets forth by way of example the preferred form of practicing the invention.

FIGURE 1 is a flow chart illustrating one form of the invention. FIGURE 2 is a graph of the viscosity curves obtained in Examples II and III.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed with particular reference to the FIGURE 1.

The present invention is based upon the discovery that a pectinase enzyme will effectively lower viscosity increases in prepared frosting compositions containing cocoa or chocolate. It was also found that when amylase enzymes and hemi-cellulase enzymes were used in conjunction with pectinase, viscosity increases could be effectively controlled during the normal storage period of the frosting. Another aspect of the invention is the control of processing conditions during enzyme treatment. Still another aspect of my invention is the use of a plurality of enzymes in a predetermined sequence. In accordance with the preferred form of the invention, treatment with a pectinase enzyme is carried out before either amylase or hemi-cellulase treatment to provide the best results. While the cause for phenomenon is not known with certainty, it is possible that the destruction of pectin in the cocoa cell walls facilitates a more effective action of hemi-cellulase and amylase on the starch and hemi-cellulose present in the cocoa cells.

In accordance with the preferred form of the invention, a suitable powdered cocoa composition of any commercially available type is placed in an aqueous slurry which is maintained at a temperature of from about 80 to 130° F. and preferably between 100 and 120° F. To this slurry is added a suitable preservative such as a suitable mold and yeast inhibitor. For this purpose, I employ a salt such as potassium sorbate in a minor amount of about 1 part for each 40 parts by weight of cocoa.

To provide a homogeneous suspension, the slurry is mixed until the slurry is uniformly blended. Prior to the addition of pectinase, the pH of the slurry is adjusted to a predetermined value to increase the action of the pectinase. While the pH can be varied between about 3.0 to about 5.6 to retain chocolate or cocoa identity, the pH is maintained between about 5 and 5.4. Any suitable acid can be used for regulating the pH such as concentrated hydrochloric acid. The pectinase is then added to the slurry. Although the pectinase can be added in the dry form, I have found that a more uniform dispersion is obtained if an aqueous slurry of the pectinase is added to the cocoa slurry. While the pectinase from any source can be employed, I prefer to use a fungal pectinase such as "Pectinol 10M" which is sold by the Rohm and Haas Chemical Company of Philadelphia, Pa. After the pectinase has been added to the slurry, the slurry is maintained at a temperature of from about 35 to 140° F. and preferably between 115 and 125° F. for a sufficient period of time to enable the pectinase to act. Agitation of the slurry containing the pectinase will insure uniform incorporation and biological action of the pectinase. A substantial effect is produced in as little as 5 minutes in the case of each enzyme used, but I have found that after a period of about one hour, the pectinase has had almost its full effect. The temperature can however be maintained at this level for a longer period of time if desired.

Concerning the amount of pectinase to use, I found that about .05 to 5.0 parts and preferably about .5 to 1.0 part for each 100 parts by weight of cocoa is preferred. Greater amounts of enzyme will of course make possible lesser treatment temperatures and times and conversely lesser concentration of enzyme can be used if treatment temperatures are increased but held below denaturation temperatures and the treatment is prolonged.

At this point in the procedure, it is desirable to remeasure the pH and if necessary adjust the pH again to about 4.3 to 6.2 and preferably between about 5.1 and 5.9. This can be done with any suitable base as for example a 10 percent solution of sodium bicarbonate which has been dissolved in water and the slurry and then is heated at about 145° F. for several minutes.

After the pH has been thus adjusted, another enzyme such as a hemi-cellulase in the amount of about .05 part by weight to about 1.0 part by weight, and advantageously in amounts ranging from about 0.10 to about 0.40 part by weight and preferably in an amount of about 0.20 part by weight is added for each 100 parts of cocoa by weight. While any of various suitable hemi-cellulase enzymes are acceptable, I prefer to use a microbial hemi-cellulase such as that sold under the trademark "CE 100" and manufactured by Miles Chemical Company of Elkhart, Ind. Following the the addition of hemi-cellulase, the temperature of the slurry is increased to about 35 to 150° F. but preferably about between 135 and 145° F. for sufficient time to enable the hemi-cellulase to produce its effect. I have found that a period of about 30 minutes at about 135° F. to about 145° F. is ordinarily satisfactory.

Following the treatment with hemi-cellulase, the pH of the slurry is again adjusted to between about 5.8 and 6.6 and preferably between about 6 and 6.4. Any suitable base such as sodium carbonate can be used. Next, amylase in the amount of about 0.50 to about 5.0 parts by weight, and advantageously ranging between about 1 to about 3 parts by weight and preferably about 2 parts by weight is added for each 100 parts by weight of cocoa and the slurry is heated to about 35° F. to 190° F. and preferably between about 182° F. and 187° F. At this temperature the amylase will produce substantially its entire effect in a period of about 45 minutes. As with all other enzymes used, longer times can be employed.

The slurry is then treated in other suitable manner to inactivate the enzymes present therein. If heat is employed for inactivating the enzymes, a temperature of about 200° F. for a period of about 15 minutes is satisfactory.

Following enzyme inactivation, the slurry is immediately cooled to 50 to 65° F. At this time, the water content of the slurry can be adjusted if a change is desired. The slurry can then be mixed with a major amount of sucrose as from 30 to 80 parts by weight, a lesser amount of corn syrup as from 2 to 20 parts by weight, a minor amount of shortening as from 2 to 20 parts by weight, flavorings, and other suitable ingredients to form a ready-to-spread frosting composition or the slurry thus prepared can be stored for later mixing with these components. If the slurry is stored in this manner, it is preferably refrigerated to about 35 to 45° F. till it is ready to use.

A preferred form of ready-to-spread frosting can be prepared by admixing with about 18 parts by weight of slurry about 8 to 12 parts by weight of shortening together with about 55 to 65 parts by weight of sucrose, about 8 to 12 parts by weight corn syrup, about 0.30 part by weight of emulsifiers such as glycerol monostearate and polysorbate 60, about 0.7 part by weight of flavoring such as vanilla for each 18 parts by weight of cocoa slurry. The formulation is then completed and the resulting product is packed in any suitable sanitary container and refrigerated to a temperature of about 35 to 45° F. during storage and shipment to retail markets where it is sold.

Several forms of cocoa are commercially available. These are usually known as low-fat cocoa which contains less than about 10 percent fat, a medium fat cocoa containing about 10 to 22 percent fat and high fat cocoa which contains over 22 percent fat. For purposes of the present invention, I prefer to employ a medium fat cocoa containing about 12½ percent fat. While the concentration of the cocoa in the slurry during the exposure to pectinase is not considered critical, I prefer to maintain the concentration of solids as great as possible in order to maintain minimum water in the fluid food product and in general prefer to use about 10 parts water by weight for each 4 parts by weight of cocoa. I have found that it is essential to have water present in order for the pectinase to produce its result.

The pH of the slurry should be between predetermined limits as mentioned above if the pectinase is to be most effective. If the pH of the slurry is too low, the acid will tend to destroy the desirable cocoa characteristics of flavor and color in the solution. Subsequent neutralization of the product will produce excessive salt in the finished food product which is of course undesirable. If the pH is too high, the enzyme will act at too slow a rate to produce its entire effect. This, of course, is also true of the temperature which if too low will slow the reaction. As stated above, it is possible to obtain results from 35 to about 140° F. but the preferred temperature range is from about 120 to 130° F.

Another aspect of the present invention derives from the discovery that the use of pectinase before amylase or hemi-cellulase produces a substantially greater effect in viscosity control than in test runs in which treatment with amylase and hemi-cellulase preceded the use of pectinase. While the cause of this phenomenon is not known with certainty, it is believed to be due to a greater physical exposure of hemi-cellulose and starch which allows subsequent treatment with amylase and hemi-cellulase to be more effective. As pectin is acted upon by pectinase, it is hydrolized to galacturonic acid. The action of pectinase together with amylase and hemi-cellulase is greater than the results produced by treatment obtained with any of them acting alone even if present in substantially increased amounts.

Even with the enzyme treatment employed as described herein, the ready-to-spread frosting compositions will increase in viscosity over a period of time. This viscosity increase is due primarily to, as in the case of untreated frosting, the absorption of moisture by the hydrocolloids present in the mixture. There is, however, a substantially reduced viscosity increase in the case of frostings embodying the invention.

The invention is also highly advantageous in providing aqueous cocoa slurries consisting of cocoa powder suspended in order to be used in preparing cocoa syrup comprising cocoa, sugar and water. Such syrups exhibit improved mouth feel and can be dispensed more easily from automatic vending equipment due to their low viscosity. For convenience the cocoa prepared in accordance with the invention will be referred to as depectinized cocoa. Although the invention can be used to produce cocoa which is entirely free of pectin, under many operating circumstances trace amounts of pectin may still be present following treatment of the cocoa in accordance with the invention.

The invention will be better understood by reference to the following examples which illustrate but a few of the ways in which the invention can be employed.

In each of the examples set forth, the following procedure is employed.

Example I

First, the cocoa and a suitable preservative such as potassium sorbate is added to water in a suitable scraper-agitator kettle equipped with a heating jacket and the slurry heated to a temperature from about 100 to 120° F. until uniformly blended. Next, the pH of the slurry is adjusted as described herein above with a suitable acid such as concentrated hydrochloric acid. In the examples in which pectinase is used, it is added to the slurry in the mixing kettle and agitation is continued for a period of about one hour during which time the temperature is maintained at about 120° F. as described above. After about an hour's time, the pH is again adjusted to about 5.5 before the addition of hemi-cellulase. Following the addition of hemi-cellulase, the temperature is maintained at about 140° F. for about 30 minutes. Amylase treatment is then carried out at about 185° F. for 45 minutes at a pH of 6.2. The enzymes are then inactivated by exposing them to a temperature of about 200 to 210° F. for 15 minutes after which the slurry is cooled to about 50 to 65° F. Fourteen parts by weight of slurry is then immediately mixed with 65 parts by weight of sugar, 10 parts by weight of shortening (emulsified hydrogenated vegetable shortening), 10 parts by weight corn syrup, and .6 part by weight vanilla, 3 parts by weight salt, and packaged for shipment or, if desired, the slurry is stored under refrigeration at a temparture of 35 to 45° F. until it is ready to use.

Examples IV and V which include no shortening or corn syrup illustrate the use of the invention in preparing dry depectinized cocoa powders and chocolate flavored sugar syrups prepared from depectinized cocoa. In Example IV, enzyme treatment was carried out as in Example II. In Example V, enzyme treatment was carried out as in Example III.

To clearly illustrate the advantages of the invention, performance data is included with representative examples.

FROSTING COMPOSITION [1]

|  | Example II | Example III |
|---|---|---|
| Cocoa | 4 | 4. |
| Water | 10 | 10. |
| Potassium sorbate | .1 | .1. |
| Pectinase |  | .032. |
| Conditions of pectinase treatment |  | 1 hr. at 120° F., pH 5.2. |
| Hemi-cellulase | .008 | .008. |
| Conditions of hemi-cellulase treatment | 30 min. at 140° F., pH 5.4 | 30 min. at 140° F., pH 5.4. |
| Amylase | .08 | .08. |
| Conditions of amylase treatment | 45 min. at 185° F., pH 6.2 | 45 min. at 185° F., pH 6.2. |
| Initial spreading consistency 3 days after preparation at— |  |  |
| 3 r.p.m | 61,698 cps | 37,349 cps. |
| 6 r.p.m | 54,647 cps | 36,710 cps. |
| 9 r.p.m | 40,104 cps | 23,886 cps. |
| 18 r.p.m | 23,798 cps | 13,660 cps. |
| 27 r.p.m | 14,984 cps | 8,373 cps. |
| Spreading consistency after 17 months storage | Firm and resistant to spreading | Soft, spreads very easily. |
| Viscosity [2] after 17 months storage at— |  |  |
| 0.972 r.p.m.: |  |  |
| Run 1 | 37,137,400×28,645,500 | 29,306,550×22,916,400. |
| Run 2 | 29,967,600×33,493,200 | 25,560,600×20,933,250. |
| 1.944 r.p.m.: |  |  |
| Run 1 | 36,578,100×30,408,300 | 18,068,700×21,153,600. |
| Run 2 | 33,493,200×24,679,200 | 24,679,200×20,272,200. |
| 2.904 r.p.m.: |  |  |
| Run 1 | 34,374,600×30,408,300 | 13,661,700×16,746,600. |
| Run 2 | 26,882,700×15,865,200 | 18,950,100×16,085,550. |

[1] Amounts are expressed in parts by weight.
[2] Rotary Viscosimeter such as Rotovisco.

COCOA ENZYME TREATED AS IN EXAMPLES II AND III AND DRIED [1]

| Example | Enzyme treatment | Cocoa | Water | Sugar | Consistency | Dispersibility of Dried Cocoa in Water During Preparation |
|---|---|---|---|---|---|---|
| IV | As in Example II | 8 | 35 | 57 | Liquid consistency | Average. |
| V | As in Example III | 8 | 35 | 57 | Greater fluidity than Example IV | Better than average. |

[1] Values are expressed in parts by weight.

COCOA COMPOSITIONS

|  | Example | | | | | |
|---|---|---|---|---|---|---|
|  | 6 | 7 | 8 | 9 | 10 | 11 |
| Cocoa | 100 | 100 | 100 | 100 | 100 | 100. |
| Water | 250 | 250 | 250 | 400 | 250 | 250. |
| Potassium sorbate | 2.5 |  |  | 2.5 |  |  |
| Pectinase | .05 | .05 | 5.0 | 5.0 | 5.0 | .05 |
| Conditions of pectinase treatment | 130° F., 1 hr., at pH 3.0 | 130° F., 1 hr., at pH 5.6 | 80° F., 1 hr., at pH 3.0 | 80° F., 1 hr., at pH 5.6 | 80° F., 1 hr., at pH 5.6 | 130° F., 1 hr., at pH 3.0 |
| Hemi-cellulase | 1.0 | 1.0 | .05 | 0.5 |  |  |
| Conditions of hemi-cellulase treatment | 140° F., 30 min., at pH 6.2 | 140° F., 30 Min., at pH 6.2 | 35° F., 30 min., at pH 4.3 | 35° F., 30 min., at pH 4.3 |  |  |
| Amylase | 5.0 | 5.0 | .50 | .50 |  |  |
| Conditions of amylase treatment | 190° F., 45 min., at pH 5.8 | 190° F., 45 min., at pH 5.8 | 35° F., 45 min., at pH 6.6 | 35° F., 45 min., at pH 6.6 |  |  |
| Shortening |  | 600 |  | 120 |  |  |
| Corn syrup |  | 400 |  | 100 |  |  |
| Flavoring |  | 2 |  | 2 |  |  |
| Sugar |  | 1,200 |  | 2,000 |  |  |

It is apparent that many modifications and variations of this invention as hereinbefore set forth may be made without departing from the spirit and scope thereof. The specific embodiments described are given by way of example only and the invention is limited only by the terms of the appended claims.

I claim:

1. The process for preparing a ready-to-spread cocoa flavored frosting mix comprising providing an aqueous slurry of finely divided cocoa particles, maintaining the pH of the slurry between about 3.0 and 5.6 and thereafter adding a minor amount of pectinase, maintaining the temperature thereof between about 35° F. and 140° F. for about a sufficient period of time to produce a significant viscosity reduction in the finished frosting, thereafter admixing shortening, sugar, and flavorings in minor amounts to produce the ready-to-spread frosting composition characterized by a reduced tendency to increase in viscosity during storage.

2. The process according to claim 1 wherein a minor amount of hemi-cellulase is placed in said slurry and maintained at a temperature of about 35° F. to 140° F. for a period of about at least 5 minutes.

3. The process according to claim 1 wherein the slurry is treated with a minor amount of amylase at a temperature of about 35° F. to 190° F. for at least 5 minutes.

4. The process according to claim 3 wherein the amylase treatment is performed subsequent to the treatment with the pectinase.

5. The process according to claim 2 wherein the treatment of said slurry with said hemi-cellulase is performed subsequent to the treatment thereof with said pectinase.

6. A process for preparing a ready-to-spread cocoa flavored frosting mix comprising the steps of preparing an aqueous cocoa slurry comprising about 10 parts by weight of water for each 4 parts by weight of cocoa, maintaining the pH of the slurry between about 5 and 5.4, adding a minor amount of pectinase and maintaining the slurry at a temperature of about 115° F. to 125° F. for a period of at least 5 minutes, adjusting the pH to between about 5.1 and 5.9, thereafter adding a hemi-cellulase enzyme and maintaining the temperature between about 135° F. and 145° F. for a period of at least 5 minutes, next adjusting the pH to between about 6 and 6.4, next adding a minor amount of amylase and maintaining the slurry at a temperature of about 35° F. and 190° F. for a period of at least 5 minutes, thereafter admixing shortening, sugar and a minor amount of flavoring to provide a ready-to-spread frosting composition.

7. The process according to claim 6 wherein based upon 100 parts by weight cocoa the amount of pectinase added to said slurry ranges from about 0.05 to 5 parts by weight, the hemi-cellulase is added in an amount of about 0.05 to about 1.0 part by weight and the amylase is added in an amount of about 0.50 to about 5.0 parts by weight.

8. A process for preparing a ready-to-spread cocoa flavored frosting mix comprising the steps of preparing an aqueous cocoa slurry comprising about 10 parts by weight of water for each 4 parts by weight of cocoa, maintaining the pH of the slurry between about 5 and 5.4, adding a minor amount of pectinase and maintaining the slurry at a temperature of about 115° F. to 125° F. for a period of at least 5 minutes, next adjusting the pH to between about 6 and 6.4, next adding a minor amount of amylase and maintaining the slurry at a temperature of about 35° F. and 190° F. for a period of at least 5 minutes, thereafter admixing shortening, sugar and a minor amount of flavoring to provide a ready-to-spread frosting composition.

9. A process for preparing a ready-to-spread cocoa flavored frosting mix comprising the steps of preparing an aqueous cocoa slurry comprising about 10 parts by weight of water for each 4 parts by weight of cocoa, maintaining the pH of the slurry between about 5 and 5.4, adding a minor amount of pectinase and maintaining the slurry at a temperature of about 115° F. to 125° F. for a period of at least 5 minutes, adjusting the pH to between about 5.1 and 5.9, thereafter adding a hemi-cellulase enzyme and maintaining the temperature between about 135° F. and 145° F. for a period of at least 5 minutes, thereafter admixing shortening, sugar and a minor amount of flavoring to provide a ready-to-spread frosting composition.

10. A ready-to-spread frosting composition comprising in combination a mixture of a depectinized cocoa in particulated form, a shortening, sugar and a minor amount of an inactivated pectinase enzyme.

11. The composition according to claim 10 wherein the fat content of the cocoa is less than 22 percent by weight and the cocoa is pectin free.

12. A cocoa composition comprising depectinized cocoa in a particulated form and an inactivated pectinase enzyme in a minor amount.

13. A dry cocoa composition comprising a mixture of depectinized cocoa in particulated form and a minor amount of an inactivated pectinase enzyme in an amount ranging from about 0.5 to 5 parts by weight inactivated pectinase for each 100 parts by weight cocoa, said depectinized cocoa having a fat content of less than about 22 percent by weight.

14. The composition according to claim 13 wherein the fat content of the cocoa ranges from 10 to 22 percent by weight and the cocoa is further characterized as being entirely free from pectin.

15. The process for preparing a cocoa comprising an aqueous slurry of finely divided cocoa particles, maintaining the pH of the slurry between about 3.0 and 5.6 and thereafter adding a minor amount of pectinase, maintaining the temperature thereof between about 35° F. and 140° F. for about a sufficient period of time to produce a significant viscosity reduction in the finished frosting.

16. A process for preparing a cocoa comprising the steps of preparing an aqueous cocoa slurry comprising about 10 parts by weight of water for each 4 parts by weight of cocoa, maintaining the pH of the slurry between about 5 and 5.4, adding a minor amount of pectinase and maintaining the slurry at a temperature of about 115° F. to 125° F. for a period of at least 5 minutes, adjusting the pH to between about 5.1 and 5.9, thereafter adding a hemi-cellulase enzyme and maintaining the temperature between about 135° F. and 145° F. for a period of at least 5 minutes, next adjusting the pH to between about 6 and 6.4, next adding a minor amount of amylase and maintaining the slurry at a temperature of about 35° F. to 190° F. for a period of at least 5 minutes.

17. A process for preparing a cocoa comprising the steps of preparing an aqueous cocoa slurry comprising about 10 parts by weight of water for each 4 parts by weight of cocoa, maintaining the pH of the slurry between about 5 and 5.4, adding a minor amount of pectinase and maintaining the slurry at a temperature of about 115° F. to 125° F. for a period of at least 5 minutes, adjusting the pH to between about 5.1 and 5.9, thereafter adding a hemi-cellulase enzyme and maintaining the temperature between about 135° F. and 145° F. for a period of at least 5 minutes.

References Cited

UNITED STATES PATENTS

| | | | |
|---|---|---|---|
| 1,650,356 | 11/1927 | Hocker | 99—26 |
| 1,854,354 | 4/1932 | Wallerstein | 99—23 |
| 1,892,449 | 12/1932 | Dengler | 99—26 |
| 2,014,342 | 9/1935 | Gutekunst | 99—26 |
| 2,689,181 | 9/1954 | Johnston et al. | 99—23 |

FOREIGN PATENTS 401,333   11/1933   Great Britain.

ALVIN E. TANENHOLTZ, *Primary Examiner.*

D. M. NAFF, *Assistant Examiner.*